W. R. TAYLOR.
FRUIT AND VEGETABLE EVAPORATOR.
APPLICATION FILED MAY 17, 1917.
1,267,144.
Patented May 21, 1918.
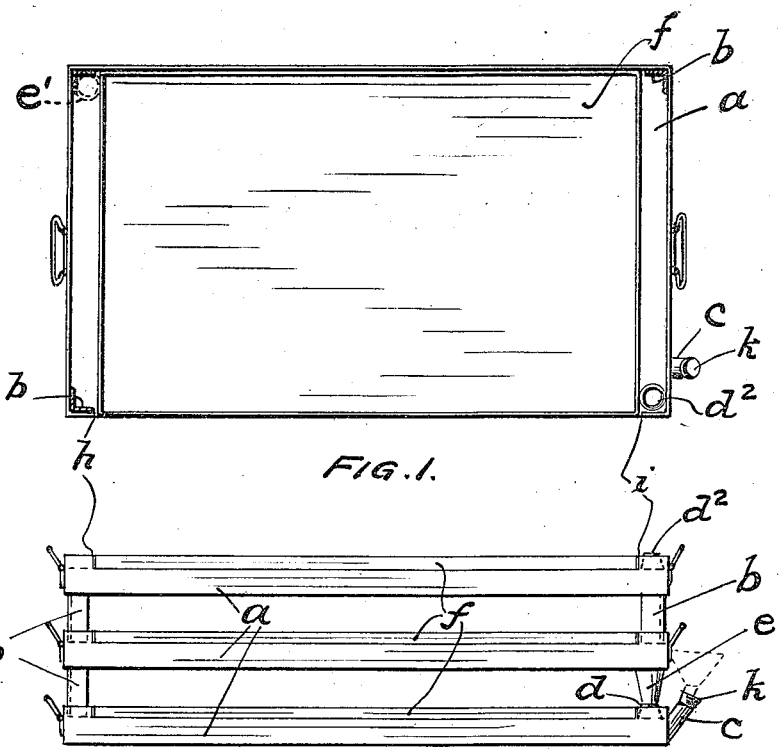
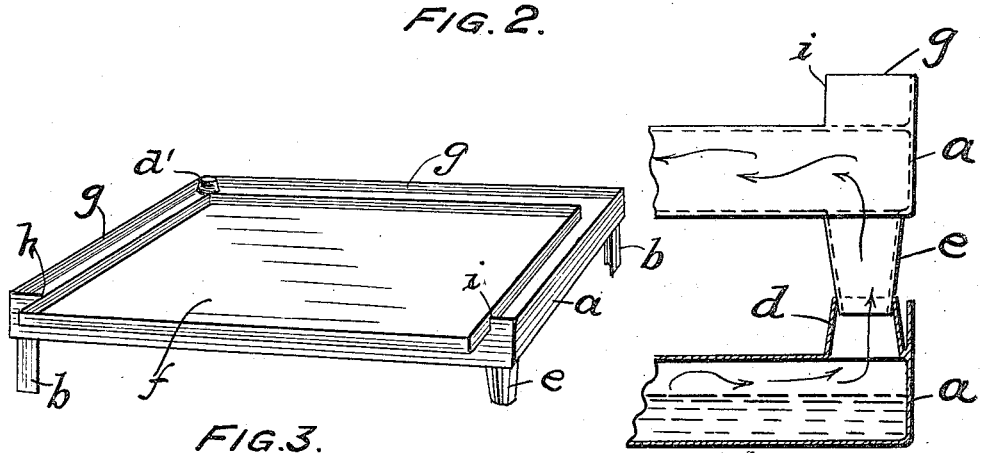
WITNESS:
Rob't R. Kitchel.
INVENTOR
Whitmore R. Taylor
BY Frank J. Busser
ATTORNEY.

UNITED STATES PATENT OFFICE.

WHILMORE R. TAYLOR, OF GERMANTOWN, PENNSYLVANIA, ASSIGNOR TO EASTERN MANUFACTURING COMPANY, OF PHILADELPHIA, PENNSYLVANIA, A FIRM.

FRUIT AND VEGETABLE EVAPORATOR.

1,267,144. Specification of Letters Patent. Patented May 21, 1918.

Application filed May 17, 1917. Serial No. 169,168.

*To all whom it may concern:*

Be it known that I, WHILMORE R. TAYLOR, a citizen of the United States, residing at Germantown, county of Philadelphia, and State of Pennsylvania, have invented a new and useful Improvement in Fruits and Vegetable Evaporators, of which the following is a full, clear, and exact description, reference being had to the accompanying drawings, which form a part of this specification.

My invention relates to means for evaporating or drying fruits and vegetables.

The evaporation of fruit and vegetables is essentially a ripening process and when properly carried on results in a rapid maturing of the juices and an increase in fruit sugar. Proper evaporation further results in a maximum development of the increased sugar and the retention in the evaporated fruit or vegetables of all the valuable and pleasant qualities of the fresh fruit; so that when the evaporated fruit is subjected to a rejuvenating bath of fresh water, it will return approximately to its original form, color and consistency.

These results are dependent upon the cell structure of the fruit or vegetables, containing the acids and starch which yield glucose or fruit sugar, remaining intact.

In order to protect the cell structures and prevent discoloration of cut fruits or vegetables, the form in which they are usually and most efficiently evaporated, it is necessary to dry the cut surfaces quickly so as to form an artificial skin or protective covering and hermetically seal the cells. This is best done by subjecting the fruit or vegetables to steam heat which dries the cut surfaces with the required rapidity, but has no tendency to burn or char.

The object of my invention is to provide an evaporator in which fruit and vegetables may be subjected to steam heat, raised to the desired temperature and evaporated or dried without injury or loss of the valuable and pleasant properties. Further, to provide an evaporator which may be conveniently used in connection with any source of heat, and which may be easily cleaned and kept in a sanitary condition.

Referring to the drawings, in which I have illustrated a preferred embodiment of my invention:

Figure 1 is a plan view of my improved evaporator.

Fig. 2 is a side elevation of my evaporator.

Fig. 3 is a perspective view of one section of my evaporator.

Fig. 4 is a sectional elevation showing detail of the heating arrangement.

The rectangular chambers $a$ are mounted one upon the other, at intervals, on the legs $b$. The lower chamber is provided with the inlet pipe $c$ at any convenient location on its side. At one corner of the lower chamber is an aperture provided with the tapered neck $d$.

The middle chamber is provided, in one of its corners, with the downwardly extending tapered pipe $e$ adapted to fit into the neck $d$ forming a tight joint and affording a connection or passageway between the interiors of the middle and lower chambers. The middle chamber is further provided with an aperture and neck $d'$, similar to the neck $d$, located in the corner of the chamber diagonally opposite to the pipe $e$.

The top chamber is provided with a neck $d^2$, in one of its corners, and diagonally opposite with a downwardly extending tapered pipe $e'$ adapted to fit into the neck $d'$ and form a passage between the top and middle chambers. The neck $d^2$ on the top chamber serves as a vent.

The various chambers are provided with the flanges $g$, which extend above their upper surfaces and serve to keep the trays $f$ in place on the surfaces of the chambers. The flanges are cut away between the points $h$ and $i$ on each chamber to permit of the ready placing and withdrawal of the trays.

In practice, the lower chamber is filled approximately half full of water, and the inlet pipe $c$ plugged with a cork as at $k$. The evaporator is then placed upon a gas, oil, coal or wood stove, or over heat of any kind. The fruit or vegetables to be evaporated are now placed on the trays, and the trays in turn placed upon the upper surfaces of the chambers.

As heat is applied to the water in the lower chamber, steam is formed and rises to the top of the chamber, heating it and the tray of fruit placed thereon. As the volume of steam increases, it passes through the pipe $e$ into the middle chamber which it heats in turn, thus heating the fruit on the tray carried thereby. The steam passes all about the inside of the middle chamber; and as the volume therein increases, it passes through the pipe $e'$ into the top chamber heating it and the fruit in the tray carried thereby. The excess steam in the top chamber is exhausted into the atmosphere through the neck $d^2$, while any condensation of the steam is permitted to run back into the lower chamber.

The inlet $c$ affords a ready means of determining the amount of water in the chamber.

It will readily be seen that the fruit is heated and dried by the action of the steam upon the surfaces of the chambers, which permits the fruit to be heated quickly to the proper temperature and at the same time prevents the temperature from rising to a point at which the fruit would be charred or burned. The steam is carried throughout all the chambers and, due to the positions of the inlets and outlets, the steam cannot pass from one chamber to another until the former is thoroughly filled with steam. It will be observed further that the fruit carried by the lower and middle chambers is subjected to the action of the heat radiating from the bottoms of the chambers above.

It will be observed that the flanges $g$ are cut away between the points $h$ and $i$. The short front flange adjacent to one corner is located opposite the neck $d$ so as to guide the tray (which is of a length less than the cut-away part of the front flange) into proper position at one side of said neck. The short front flange adjacent to the other corner is cut away for the sake of uniformity and appearance. By so constructing the units, each of them is adapted to receive a tray but is also adapted to receive and retain direct the fruits or vegetables to be dried if it is desired to dispense with the trays.

Having now fully described my invention, what I desire to claim and protect by Letters Patent is:—

1. A fruit and vegetable evaporator comprising a chamber provided at one corner with a depending pipe tapering toward its lower end and provided at its diagonally opposite corner with an upstanding pipe, whereby the lower part only of said depending pipe is adapted to enter, and be thus directly supported by, the upstanding pipe of a second underlying chamber and said first mentioned upstanding pipe is adapted to similarly engage the depending pipe of a third superimposed chamber, the engagement between said pipes thus affording means whereby one chamber is supported by, and spaced from, another, as well as a passage for steam.

2. A fruit and vegetable evaporator comprising a chamber provided at one corner with a depending pipe tapering toward its lower end and provided at its diagonally opposite corner with an upstanding pipe tapered toward its upper end, whereby said upstanding pipe is adapted to engage the depending pipe of a second superimposed chamber and said first mentioned depending pipe is adapted to engage the upstanding pipe of a third underlying chamber, the engagement between said pipes affording both a passage for steam and means whereby one chamber is supported by, and spaced from, another.

3. A fruit and vegetable evaporator comprising a plurality of chambers one above the other, slidably removable trays adapted to rest upon the upper surfaces of the several chambers, means connecting the chambers and affording passages for steam from chamber to chamber, and flanges extending above the upper surfaces of each chamber and entirely around the rear and the opposite sides thereof and along the front for short distances adjacent to said opposite sides.

4. A fruit and vegetable evaporator unit comprising a heating chamber provided with a flat horizontal upper surface, a fluid inlet, a fluid outlet at one of its corners, and an upright flange extending above its flat surface around the rear and the opposite sides thereof and along that part of the front opposite said fluid outlet, the flange being cut away along the greater part of the front, whereby the unit is adapted either to hold the articles to be treated or to receive and retain a slidable flanged tray holding such articles.

In testimony of which invention, I have hereunto set my hand, at Philadelphia, on this 16th day of May, 1917.

WHILMORE R. TAYLOR.